(12) United States Patent
Hamada

(10) Patent No.: US 8,526,740 B2
(45) Date of Patent: Sep. 3, 2013

(54) IMAGE PROCESSING DEVICE AND RECORDING MEDIUM

(75) Inventor: Akira Hamada, Kanagawa (JP)

(73) Assignee: Casio Computer Co., Ltd., Tokyo (JP)

( * ) Notice: Subject to any disclaimer, the term of this patent is extended or adjusted under 35 U.S.C. 154(b) by 1069 days.

(21) Appl. No.: 12/533,154

(22) Filed: Jul. 31, 2009

(65) Prior Publication Data

US 2010/0034463 A1  Feb. 11, 2010

(30) Foreign Application Priority Data

Aug. 5, 2008 (JP) ................................. 2008-201961
Apr. 20, 2009 (JP) ................................. 2009-102353

(51) Int. Cl.
*G06K 9/00* (2006.01)

(52) U.S. Cl.
USPC .......................... 382/190; 348/208.4; 382/103

(58) Field of Classification Search
USPC ........... 382/103, 190, 266; 348/208.2, 208.4, 348/208.11, 208.99
See application file for complete search history.

(56) References Cited

U.S. PATENT DOCUMENTS

| | | | | |
|---|---|---|---|---|
| 7,636,106 | B2 * | 12/2009 | Kumaki | 348/208.4 |
| 7,688,352 | B2 * | 3/2010 | Nomura et al. | 348/208.11 |
| 2006/0077262 | A1 * | 4/2006 | Miyamaki et al. | 348/211.99 |
| 2010/0034463 | A1 * | 2/2010 | Hamada | 382/190 |

FOREIGN PATENT DOCUMENTS

| | | |
|---|---|---|
| JP | 2001-109884 A | 4/2001 |
| JP | 2001-197405 A | 7/2001 |
| JP | 2002-329298 A | 11/2002 |
| JP | 2005-137395 A | 6/2005 |
| JP | 2008-078837 A | 4/2008 |
| JP | 2009-079148 A | 4/2009 |
| WO | WO 2008/041401 A1 | 4/2008 |

OTHER PUBLICATIONS

Japanese Office Action dated Feb. 19, 2013 (and English translation thereof) in counterpart Japanese Application No. 2011-010317.
Japanese Office Action dated Jun. 5, 2012 and English translation thereof in counterpart Japanese Application No. 2011-010317.
Japanese Office Action dated Nov. 15, 2010, issued in counterpart Japanese Application No. 2009-102353, and English translation thereof.

* cited by examiner

*Primary Examiner* — Gregory M Desire
(74) *Attorney, Agent, or Firm* — Holtz, Holtz, Goodman & Chick, PC

(57) ABSTRACT

The interval designation section 222 sequentially alters and designates a movement interval D and a non-movement interval D' in an entire interval. Each time a movement interval D is designated, the value determination section 223 determines the average value of the image variation amount array E in the movement interval D as a function value a of the unit rectangular function r[x] and the average value of the image variation amount array E in the non-movement intervals D' as a function value b of the unit rectangular function r[x]. Each time a movement interval D is designated, a degree of divergence J between the function values a, b and the image variation amount array E is calculated by the divergence calculation section 224. Then, only the frame images contained in the movement interval D designated when the degree of divergence J is at a minimum are extracted.

6 Claims, 13 Drawing Sheets

IMAGE PROCESSING DEVICE AND RECORDING MEDIUM

This application is based on and claims the benefit of priority from Japanese Patent Application Nos. 2008-201961 and 2009-102353, respectively filed on 5 Aug. 2008 and 20 Apr. 2009, the contents of which are incorporated herein by reference.

BACKGROUND OF THE INVENTION

1. Field of the Invention

The present invention relates to an image processing device, and particularly relates to a technology for extracting a subset of images from a plurality of images.

2. Related Art

Heretofore, digital cameras have been known that extract images in which a subject is moving, from among a plurality of images which are continuous in chronological order (see Japanese Unexamined Patent Publication No. 2008-78837). More specifically, a plurality of images obtained by continuous photography is read out in chronological order, and if an amount of change of the currently read image from the previously read image is at or above a predetermined value, the currently read image is displayed. According to such a digital camera, only images corresponding to scenes in which changes in a subject are large or movements of a subject are large are extracted.

However, in the above-described conventional digital camera, images are extracted unconditionally when an amount of change between images that are adjacent in chronological order is at or above a threshold. Therefore, there is a problem in that a subset of images with large movement of the subject cannot be properly extracted if photography conditions have varied. For example, even if the subject is stationary, the amounts of change between the images are large if hand blurring, flicker of fluorescent lighting or the like occurs. In this case, in the above-described conventional digital camera, it is judged that there are large movements of the subject and the images are extracted regardless of the subject itself being stationary.

Accordingly, it is an object of the present invention to provide an image processing device and recording medium that accurately extract a subset of images with large movement of a subject from a plurality of images, regardless of photography conditions.

SUMMARY OF THE INVENTION

In accordance with a first aspect of the present invention, there is provided An image processing device comprising: an image input section that inputs a plurality of images that are continuous in chronological order; a variation amount calculation section that calculates respective variation amounts between images that are adjacent in chronological order, for the plurality of images input; an interval designation section that sequentially designates a first interval contained in an entire interval in which all of the plurality of images are present in chronological order, while sequentially altering the first interval, and sequentially designates a second interval, which is an interval excluding the sequentially designated first interval from the entire interval; a value determination section that determines a first value on the basis of first variation amounts, which are calculated by the variation amount calculation section from the images that are present in the designated first interval, and that determines a second value on the basis of second variation amounts, which are calculated by the variation amount calculation section from the images that are present in the designated second interval; a degree of divergence calculation section that, every time the first interval is designated, calculates a first degree of divergence between the first variation amounts and the first value and, every time the second interval is designated, calculates a second degree of divergence between the second variation amounts and the second value; and an image extraction section that extracts images that are present in the first interval designated by the interval designation section at a time when a sum of the calculated first degree of divergence and second degree of divergence is at a minimum.

In accordance with a second aspect of the present invention, there is provided an image processing device comprising: an image input section that inputs a plurality of images that are continuous in chronological order; an extraction number setting section that sets a number of images to be extracted from the plurality of images input; a variation amount calculation section that calculates, for the plurality of images input, respective variation amounts between the images defined by images adjacent thereto in chronological order; a variation amount identification section that sequentially identifies, among each variation amount calculated by the variation amount calculation section, each variation amount that is smaller than a variation amount corresponding to the number set by the extraction number setting section; an image removal section that removes an image that defines each variation amount identified by the variation amount identification section from the plurality of images input; and an image extraction section that extracts, from the plurality of images input, images that are not removed by the image removal section.

In accordance with a third aspect of the present invention, there is provided a computer readable storage medium storing a program executable by a computer to function as: an image input section that inputs a plurality of images that are continuous in chronological order; a variation amount calculation section that calculates respective variation amounts between images that are adjacent in chronological order, for the plurality of images input; an interval designation section that sequentially designates a first interval contained in an entire interval in which all of the plurality of images are present in chronological order, while sequentially altering the first interval, and sequentially designates a second interval, which is an interval excluding the sequentially designated first interval from the entire interval; a value determination section that determines a first value on the basis of first variation amounts, which are calculated by the variation amount calculation section from the images that are present in the designated first interval, and that determines a second value on the basis of second variation amounts, which are calculated by the variation amount calculation section from the images that are present in the designated second interval; a degree of divergence calculation section that, every time the first Interval is designated, calculates a first degree of divergence between the first variation amounts and the first value and, every time the second interval is designated, calculates a second degree of divergence between the second variation amounts and the second value; and an image extraction section that extracts images that are present in the first interval designated by the interval designation section at a time when a sum of the calculated first degree of divergence and second degree of divergence is at a minimum.

In accordance with a fourth aspect of the present invention, there is provided a computer readable storage medium storing a program executable by a computer to function as: image input section that inputs a plurality of images that are continuous in chronological order; an extraction number setting section that sets a number of images to be extracted from the plurality of images input; a variation amount calculation section that calculates, for the plurality of images input, respective variation amounts between the images defined by images adjacent thereto in chronological order; a variation amount identification section that sequentially identifies, among each variation amount calculated by the variation amount calculation section, each variation amount that is smaller than a variation amount corresponding to the number set by the extraction number setting section; an image removal section that removes an image that defines each variation amount identified by the variation amount identification section from the plurality of images input; aid an image extraction section that extracts, from the plurality of images input, images that are not removed by the image removal section.

According to the present invention, it is possible to accurately extract a subset of images with large movements of a subject from a plurality of images, regardless of photography conditions.

DETAILED DESCRIPTION OF THE INVENTION

First Embodiment

Herebelow, a first preferred embodiment of the present invention is described on the basis of the attached drawings.

Figure 1:
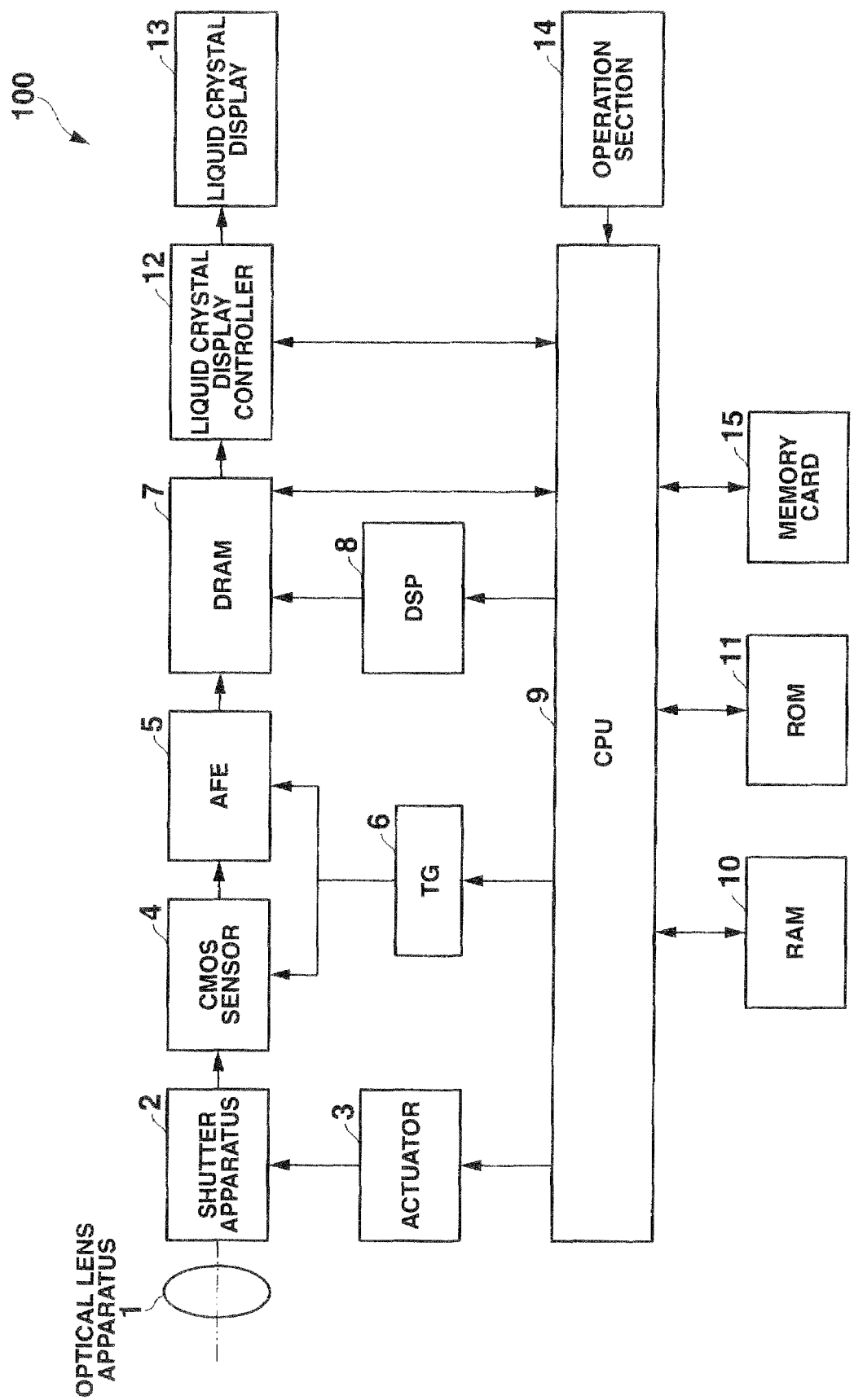
FIG. 1 is a diagram showing the constitution of hardware of an image processing device related to a first embodiment of the present invention.

FIG. 1 is a diagram snowing the constitution of hardware of an image processing device 100 related to the first embodiment of the present invention. The image processing device 100 may be constituted by, for example, a digital camera.

The image processing device 100 is provided with an optical lens apparatus 1, a shutter apparatus 2, an actuator 3, a CMOS sensor 4, an AFE 5, a TG 6, a DRAM 7, a DSP 8, a CPU 9, a RAM 10, a ROM 11, a liquid crystal display controller 12, a liquid crystal display 13, an operation section 14 and a memory card 15.

The optical lens apparatus 1 is constituted with a focusing lens, a zoom lens or the like. The focusing lens is a lens for focusing a subject image at a light-receiving surface of the CMOS sensor 4.

The shutter apparatus 2 functions as a mechanical shutter that blocks light flux from being incident on the CMOS sensor 4, and also functions as an aperture that regulates an amount of light flux that is incident on the CMOS sensor 4. The shutter apparatus 2 is structured with shutter blades or the like. The actuator 3 opens and closes the shutter blades of the shutter apparatus 2 in accordance with control by the CPU 9.

The CMOS sensor 4 is an image sensor that optoelectronically converts (photographs) a subject image that is incident through the optical lens apparatus 1.

The CMOS sensor 4 optoelectronically converts the subject light and accumulates image signals over constant time intervals, in accordance with clock pulses provided from the TG 6, and sequentially outputs the accumulated image signals. The CMOS sensor 4 is constituted by a CMOS (complementary metal oxide semiconductor) type image sensor or the like.

The AFE (analog front end) 5 generates and outputs digital signals by applying various kinds of signal processing, such as A/D (analog/digital) conversion processing and the like, to the image signals supplied from the CMOS sensor 4, in accordance with clock pulses provided from the TG 6.

The TG (timing generator) 6 provides clock pulses at constant intervals to each of the CMOS sensor 4 and the AFE 5 in accordance with control by the CPU 9.

The DRAM (dynamic random access memory) 7 temporarily stores digital signals generated by the AFE 5, image data generated by the DSP 8 and the like.

The DSP (digital signal processor) 8 generates frame image data, configured with luminance signals and chrominance signals by applying various kinds of image processing, such as white balance correction processing, gamma correction processing, YC conversion processing and the like, to the digital image signals stored in the DRAM 7 in accordance with control by the CPU 9. In the descriptions hereinafter, an image expressed by this frame image data is referred to as a frame image.

The CPU (central processing unit) 9 controls overall operations of the image processing device 100. The RAM (random access memory) 10 functions as a working area during execution of each processes by the CPU 9. The ROM (read-only memory) 11 stores programs, data and the like that are required for the execution of processes by the image processing device 100. The CPU 9 uses the RAM 10 as a working area and executes each processing in cooperation with the programs stored in the ROM 11.

In accordance with control by the CPU 9, the liquid crystal display controller 12 outputs analog signals by converting the frame image data stored in the DRAM 7, the memory card 15 or the like. The liquid crystal display 13 displays images represented by the analog signals provided from the liquid crystal display controller 12 and the like.

The operation section 14 receives operations of various buttons by a user. The operation section 14 is provided with a power supply button, a cross key button, a set button, a menu button, a shutter button and the like. The operation section 14 provides signals corresponding to operations of the various buttons that are received from the user to the CPU 9. When the CPU 9 receives these signals from the operation section 14, the CPU 9 executes processes in accordance with the received signals.

The memory card 15 is a recording medium that records the frame image data generated by the DSP 8.

Figure 2:
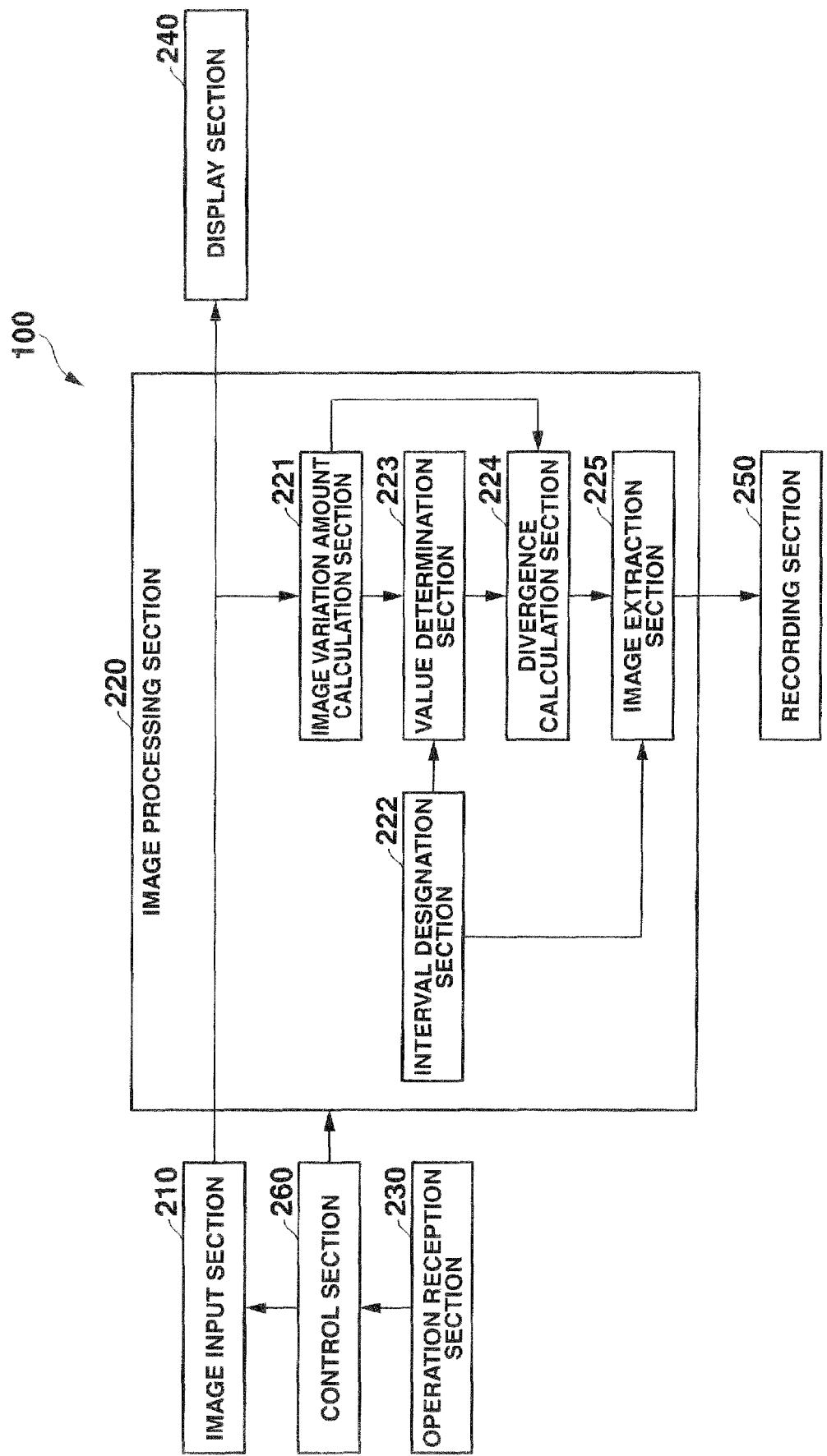
FIG. 2 is a block diagram showing a functional structure of the image processing device related to the first embodiment of the present invention.

FIG. 2 is a block diagram showing a functional structure of the image processing device 100 related to the present embodiment. In the present embodiment, the image processing device 100 is anticipated to be provided with an image input section 210, an image processing section 220, an operation reception section 230, a display section 240, a recording section 250 and a control section 260.

The image input section 210 inputs data of a plurality of frame images in accordance with control by the control section 260. The frame images represented by the data of the plurality of frame images are continuous in chronological order. The image input section 210 may be realized by the optical lens apparatus 1, shutter apparatus 2, actuator 3, CMOS sensor 4, AFE 5, TG 6, DRAM 7 and DSP 8 shown in FIG. 1.

The image processing section 220 executes later-described image variation amount calculation processing and image extraction processing in accordance with control by the control section 260. The image processing section 220 is provided with an image variation amount calculation section 221, an interval designation section 222, a value determination section 223, a divergence calculation section 224 and an image extraction section 225.

From reduced images of the frame images input by the image input section 210, the image variation amount calculation section 221 respectively calculates variation amounts (for example, sums of differences between pixel values) between reduced images that are adjacent in chronological order. The image variation amount calculation section 221 may be realized by the CPU 9 shown in FIG. 1.

The interval designation section 222 sequentially alters a predetermined movement interval D (a first interval) in an entire interval of the time series, in which all of the reduced images of the frame images input by the image input section 210 are present, and sequentially designates the movement interval D altered. The interval designation section 222 also sequentially designates (a) non-movement interval(s) D' (second intervals), which is an interval that is left when the movement interval D is excluded from the above-mentioned entire interval. The movement interval D and non-movement intervals D' are described later. The interval designation section 222 supplies designation results for the movement interval D and non-movement intervals D' to the value determination section 223. The interval designation section 222 may be realized by the CPU 9 shown in FIG. 1. The movement interval D may be, for example, a single interval in the entire interval, in which the reduced images of the frame images are not intermittent, and the non-movement intervals D' may be the intervals that remain when the movement interval D is excluded from the entire interval.

The value determination section 223 determines, as a first value, a value based on a variation amount hereinafter referred to as "first variation amount" between the reduced images that are present in the movement interval D designated by the interval designation section 222 (for example, an average value of amounts of change between the reduced images present in the movement interval D). The value determination section 223 also determines, as a second value, a value based on a variation amount hereinafter referred to as "second variation amount" between the reduced images that are present in the non-movement intervals D' designated by the interval designation section 222 (for example, an average value of amounts of change between the reduced images present in the non-movement intervals D'). The value determination section 223 provides the results of determination of the first value and the second value to the divergence calculation section 224. The value determination section 223 may be realized by the CPU 9 shown in FIG. 1.

Each time a movement interval D is designated by the interval designation section 222, the divergence calculation section 224 calculates a degree of divergence (hereinafter referred to as a first degree of divergence) between first variation amounts and the first value (which is the average value of the first variation amounts or such). In addition, each time the non-movement intervals D' are designated by the interval designation section 222, the divergence calculation section 224 calculates a degree of divergence (hereinafter referred to as a second degree of divergence) between second variation amounts and the second value (which is the average value of the second variation amounts or such). The divergence calculation section 224 may be realized by the CPU 9 shown in FIG. 1.

For a time when a sum of the first degree of divergence and second degree of divergence calculated by the divergence calculation section 224 is at a minimum, the image extraction section 225 extracts reduced images that are present in the movement interval D designated by the interval designation section 222 at that time from the reduced images of the frame images input by the image input section 210. The image extraction section 225 may be realized by the CPU 9 shown in FIG. 1.

The operation reception section 230 receives user operations of the image processing device 100. These operations include, at the image processing device 100, an operation for a user to instruct photography, an operation for a user to specify a number of images to be photographed (hereinafter referred to as a photograph number), an operation for a user to specify a number of frame images to be extracted by the image extraction section 225 (hereinafter referred to as an extraction number), and so forth. The operation reception section 230 provides the results of received user operations to the control section 260. The operation reception section 230 may be realized by the operation section 14 shown in FIG. 1.

The display section 240 displays frame images input by the image input section 210 and the like. The display section 240 may be realized by the liquid crystal display controller 12 and liquid crystal display 13 shown in FIG. 1.

The recording section 250 records frame image data representing the frame images extracted by the image extraction section 225. The recording section 250 may be realized by the memory card 15 shown in FIG. 1.

The control section 260 performs supervisory control of the processing executed by the respective sections. The control section 260 may be realized by the CPU 9, RAM 10 and ROM 11 shown in FIG. 1.

Figure 3:
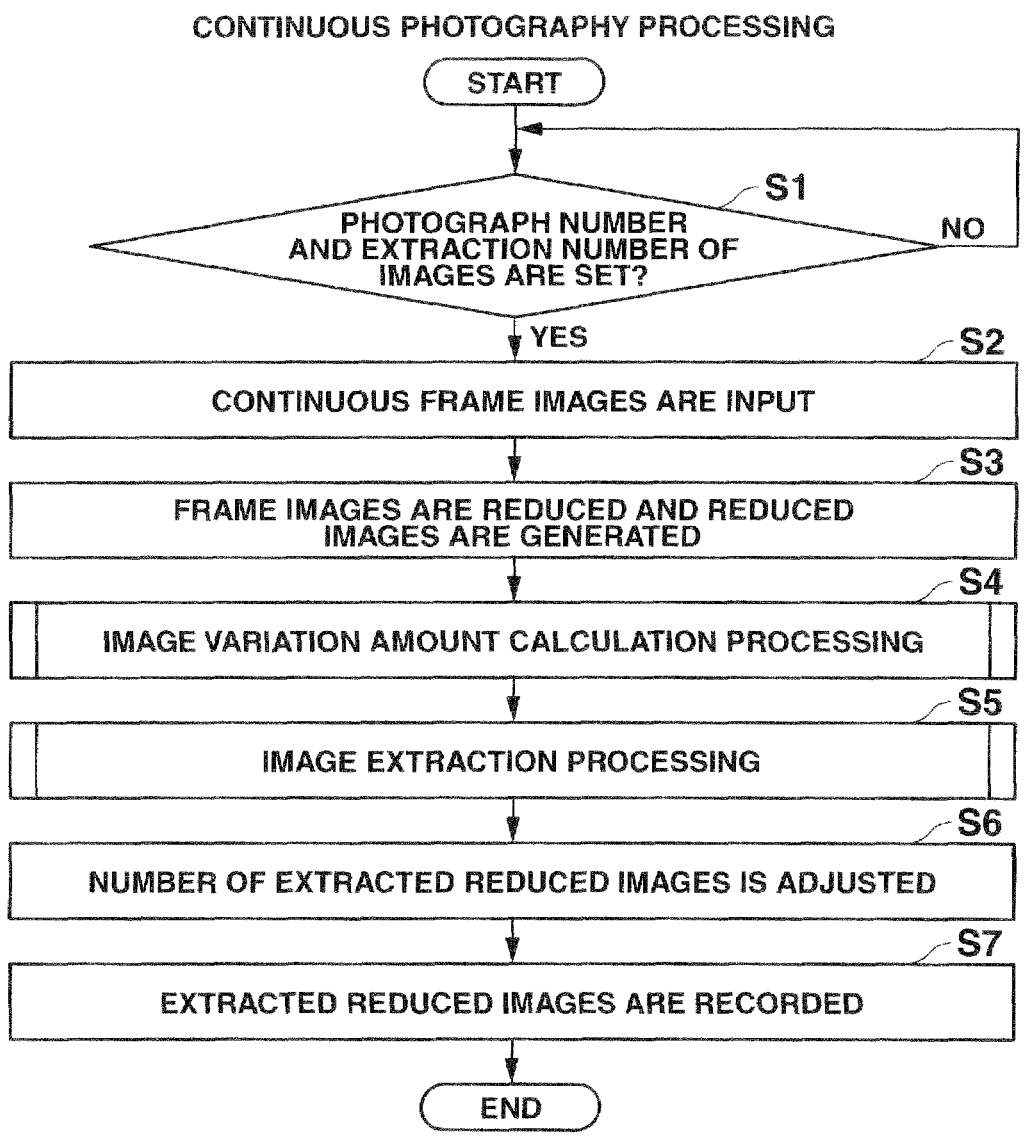
FIG. 3 is a flowchart showing a flow of continuous photography processing, according to the first embodiment of the present invention.

FIG. 3 is a flowchart showing an example of the flow of continuous photography processing which is executed by the image processing device 100. This continuous photography processing is described as being processing that is executed by the control section 260 (the CPU 9). The continuous photography processing starts at a time at which a predetermined operation is carried out at the operation reception section 230 by a user.

The control section 260 starts the continuous photography processing and sequentially provides frame images input by the image input section 210 to the display section 240, and the frame images are displayed at the display section 240 as a live preview image.

In Step S1, the control section 260 judges whether or not operations specifying the photograph number and extraction number of images have been carried out by a user. More specifically, the control section 260 judges whether or not operations have been carried out by a user for specifying the photograph number and extraction number of images, from whether or not signals corresponding to the operations for specifying the photograph number and extraction number have been provided from the operation reception section 230. In a case where the judgment of Step Si is "Yes", the control section 260 specifies the photograph number and extraction number corresponding to the user operations, and the processing advances to Step S2. On the other hand, in a case where the judgment of Step S1 Is "No", the control section 260 repeats the processing of Step S1.

Figure 4:
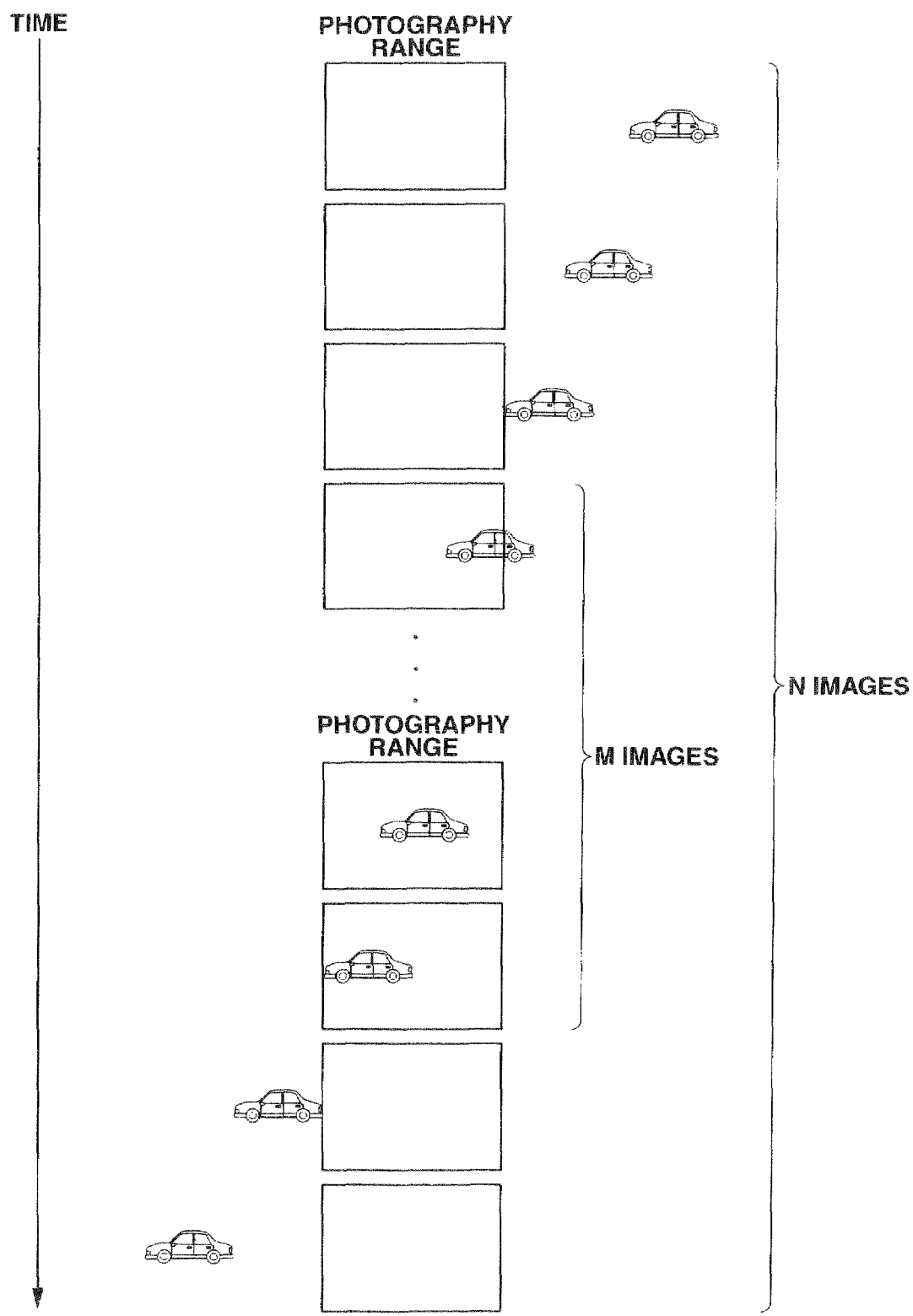
FIG. 4 is a diagram showing an example of relationship between a photography range and a subject, according to the first embodiment of the present invention.

In descriptions hereafter, the specified photograph number is assumed to be N and the specified extraction number is assumed to be M. That is, from N frame images that are continuous in chronological order, M frame images with large movements of a subject between chronologically successive frame images are extracted. For example, as illustrated in FIG. 4, the image processing device 100 photographs N continuous images when an automobile is passing through a photography range of the CMOS sensor 4. From these N continuous images, only M images in which the automobile is photographed moving in the photography range are extracted.

In Step S2, the control section 260 monitors for signals corresponding to operation of a shutter button, which are provided from the operation reception section 230 When the control section 260 detects a signal corresponding to operation of the shutter button by a user, the control section 260 inputs N frame images, which are continuous in chronological order, to the image input section 210 (continuous photography). In the following descriptions, these N frame images are indicated by $p[x]$, in which $0 \leq x \leq N-1$. x is an index number applied to the respective frame images. The index numbers $0, 1, 2, \ldots, N-1$ are progressively applied in order from the oldest frame image in chronological order. Thus, an image array P is formed in which these frame images are arranged in index number order, that is, in chronological order.

In Step S3, the control section 260 reduces the photographed N frame images with a photograph processing section not illustrated and generates N reduced images arranged in chronological order. This reduction processing is commonly performed processing that reduces the number of pixels of an image. The reduction ratio is suitably determined to suit characteristics of the camera, with consideration to the minimum size of a subject, the effects of hand blurring, and the like In the following descriptions, the reduced images are respectively indicated by $ps[x]$ ($0 \leq x \leq N-1$) The reduction processing matches the index number of each frame image with the index number of the reduced image that is generated from that frame image. That is, for the reduced images, similarly to the frame images, the index numbers $0, 1, 2, \ldots, N-1$ are progressively applied in order from the oldest reduced image in chronological order.

Figure 5:
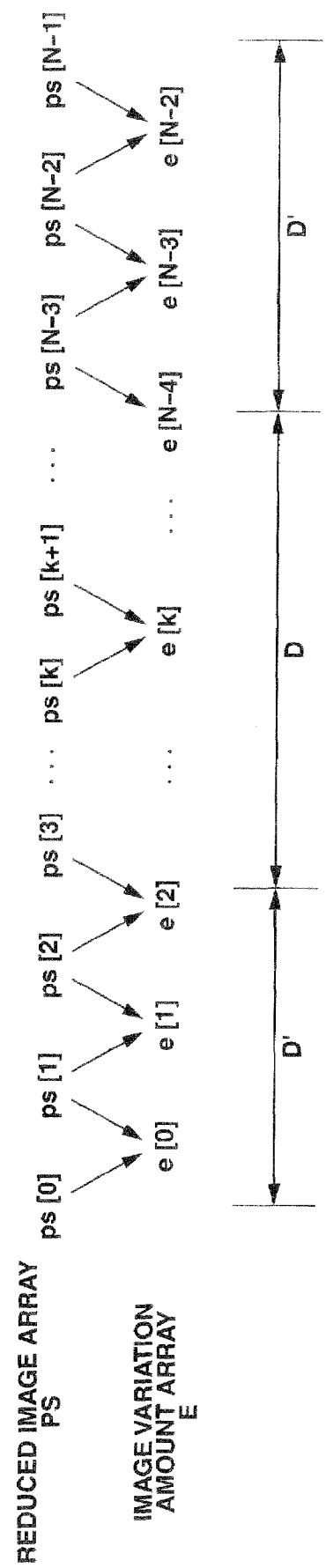
FIG. 5 is a diagram illustrating a reduced image array and an image variation amount array, according to the first embodiment of the present invention.

Thus, as illustrated in FIG. 5, a reduced image array PS is formed in which the reduced images are arranged in index number order, that is, in chronological order.

In Step S4, the control section 260 carries out the image variation amount calculation processing. That is, as shown in FIG. 5, variation amounts between chronologically successive reduced images $ps[x]$ in the reduced image array PS are calculated to serve as image variation amounts e. Index numbers for the image variation amounts e are the aforementioned x. The calculated image variation amounts are indicated by $e[x]$ ($0 \leq x \leq N-2$). Here, the index numbers $0, 1, 2, \ldots, N-2$ are progressively applied in order from the oldest image variation amount in chronological order. Thus, an image variation amount array E is formed in which these image variation amounts $e[x]$ are arranged in index number order, that is, in chronological order. Details of the image variation amount calculation processing of Step S4 will be described later.

In Step S5, the control section 260 extracts, from the N reduced images, only reduced images with relatively large subject image movements. Details of the image extraction processing of Step S5 will be described later.

In Step S6, the control section 260 performs adjustment such that the reduced images extracted by the processing of Step S5 are M images. Here, given that the extraction number specified by user operations is M, if a number of reduced images larger than M is extracted by the processing of Step S5 or if a number of reduced images smaller than M is extracted by the processing of Step S5, then it is necessary to adjust the number of reduced images to the M images desired by the user.

More specifically, in a case where the number of extracted reduced images is larger than M, then, for example, images contained in the movement interval D are extracted at predetermined intervals to bring the number of images to M. On the other hand, in a case where the number of extracted reduced images is smaller than M, then, for example, the number of reduced images contained in the movement interval D is brought to M by expanding the extent of the movement interval D.

In Step S7, the control section 260 records in the recording section 250 only frame image data that corresponds to the reduced images which have been adjusted to the extraction number by the processing of Step S6. At this time, the control section 260 briefly displays a synthesized image in which the frame image data recorded in the recording section 250 is synthesized, or displays reduced images of the frame image data or the like, at the display section 240.

Figure 6:
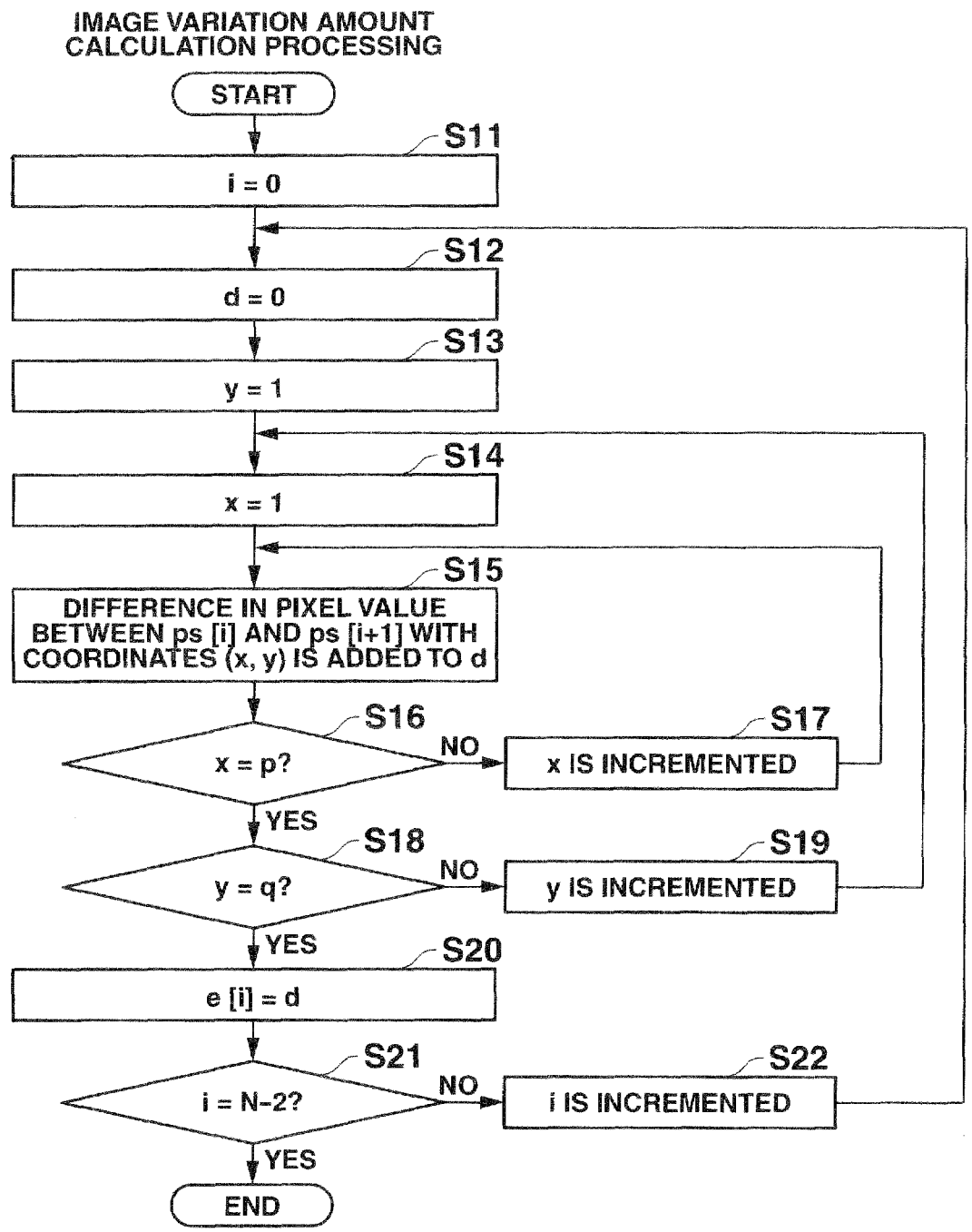
FIG. 6 is a flowchart showing an image variation amount calculation processing, according to the first embodiment of the present invention.

FIG. 6 is a flowchart showing an example of the particular flow of the image variation amount calculation processing of Step S4. Details of the image variation amount calculation processing will be described with reference to FIG. 6. In the following descriptions, this image variation amount calculation processing is carried out by the image processing section 220 in accordance with control by the control section 260.

The image variation amount calculation processing is processing that calculates, as the image variation amounts e, sums of absolute values of differences between the pixel values of pixels at the same respective positions in the reduced images ps that are adjacent to one another in chronological order. Therefore, the image variation amounts e are defined by the reduced images ps that are adjacent to one another in chronological order.

In the descriptions related to this image variation amount calculation processing, d is a provisional value of the sum total of an image variation amount e. Alternatively, where appropriate, the index number of a reduced image is expressed by i instead of the aforementioned x. In addition, in regard to the number of pixels of a reduced image ps[i], the number of pixels in an x direction, which is a horizontal direction, is p, and the number of images in a y direction, which is a vertical direction, is q. The position of an arbitrary pixel in a reduced image ps[i] is indicated by the coordinates (x,y).

The image processing section 220 sets the index number i to 0 (zero) (Step S11), sets an initial value of the provisional value d to 0 (Step S12), sets an initial value of the y coordinate to 1 (Step S13), and sets an initial value of the x coordinate to 1 (Step S14).

Next, the image variation amount calculation section 221 of the image processing section 220 calculates the absolute value of the difference between the pixel value of the pixel with coordinates (x,y) in the reduced image ps[i] and the pixel value of the pixel with coordinates (x,y) in the reduced image ps[i+1], and adds the calculated absolute value of the difference to the provisional value d (Step S15).

Next, the image processing section 220 judges whether or not x equals p (Step S16). In a case where the judgment of Step S16 is "Yes", the image processing section 220 advances the processing to Step S18. On the other hand, in a case where the judgment of Step S16 is "No", the image processing section 220 increments the coordinate x (increases x by 1) (Step S17) and returns the processing to Step S15.

Then the image processing section 220 judges whether or not y equals q (Step S18). In a case where the judgment of Step S18 is "No", the image processing section 220 increments the coordinate y (increases y by 1) (Step S19) and returns the processing to Step S14.

On the other hand, in a case where the judgment of Step S18 is "Yes", the image processing section 220 retains the image variation amount e[i] as the provisional value d (Step S20). Next, the image processing section 220 judges whether or not the current index number i equals N−2 (N being the photograph number specified in the processing of Step S1) (Step S21) In a case where the judgment of Step S21 is "No", the image processing section 220 implements the counter i (increases i by 1) (Step S22), and returns the processing to Step S12. On the other hand, in a case where the judgment of Step S21 is "Yes", the image processing section 220 ends the image variation amount calculation processing.

Figure 7:
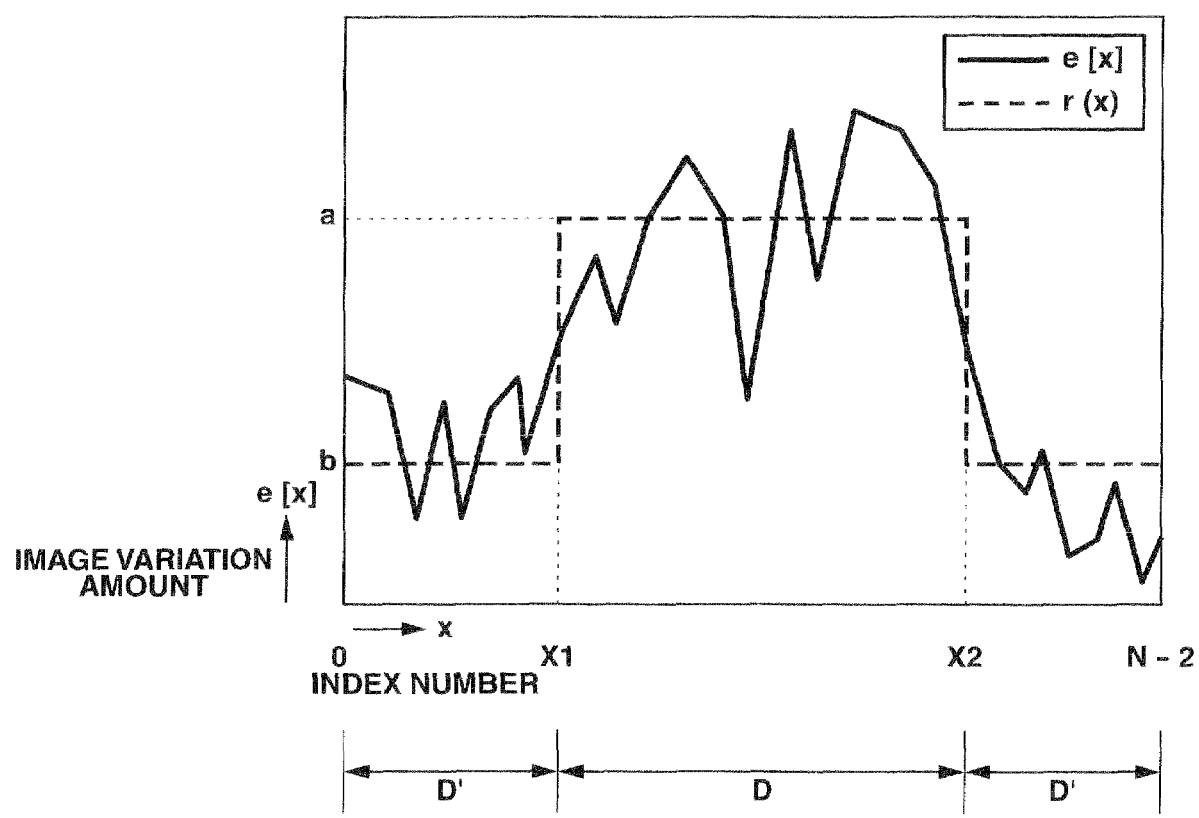
FIG. 7 is a diagram showing an example of a relationship between a unit rectangular function and an image variation amount array, according to the first embodiment of the present invention.

Now the image extraction processing of Step S5 is described with reference to FIG. 7. In FIG. 7, the horizontal axis shows the index number x, and the vertical axis shows the image variation amount e[x] The curve shown by a solid line in the drawing represents the image variation amounts e[x] corresponding to the index numbers x, and the curve shown by a broken line represents a unit rectangular function r[x], which is described later. In addition, the curve shown by a dotted line shows a unit rectangular function that is described later. It should be noted that the values of the image variation amounts e[x] are discrete values that are determined for each value of the index number x, which is an integer. Accordingly, in FIG. 7, the values of the image variation amounts e[x] are shown joined by straight lines.

Firstly, index numbers corresponding to the start point and end point of a movement interval D are set to $x_1$ and $x_2$, respectively. Thus, the movement interval D is the interval from $x_1$ to $x_2$, and is represented as follows:

$$D = [X_1, X_2] \ (0 < X_1 < X_2 < N-2)$$

in which $[x_1, x_2]$ represents the interval from $x_1$ to $x_2$. $x_1$ and $x_2$ are delimiters (boundaries) between the movement interval D and the non-movement intervals D'. The interval designation section 222 of the image processing section 220 sequentially designates all combinations of the above-mentioned start point $x_1$ and end point $x_2$, and performs the following processing on the movement interval D and the plurality of non-movement intervals D' that are respectively defined by the plurality of combinations of $x_1$ and $x_2$.

For each of the combinations of $x_1$ and $x_2$ designated by the interval designation section 222, the value determination section 223 of the image processing section 220 determines a first value on the basis of the image variation amounts e[x] corresponding to all the index numbers x contained in the movement interval D. For each of the combinations of $x_1$ and $x_2$ designated by the interval designation section 222, the value determination section 223 of the image processing section 220 also determines a second value on the basis of the image variation amounts e[x] corresponding to all the index numbers x contained in the non-movement intervals D'. More specifically, the value determination section 223 calculates a, which is an average value of each of the image variation amounts e[x] of the image variation amount array E in the movement interval D, and determines a to be the first value. Furthermore, the value determination section 223 calculates b, which is an average value of each of the image variation amounts e[x] of the image variation amount array E in the non-movement intervals D', and determines b to be the second value.

For each of the combinations of $x_1$ and $x_2$ designated by the interval designation section 222, the divergence calculation section 224 of the image processing section 220 defines the unit rectangular function r[x] as follows.

$$r[x] = \begin{cases} a & (x \notin D) \\ b & (x \in D) \end{cases}$$

The value of the unit rectangular function r[x] is a in the movement interval D and is b in the non-movement intervals D'.

For each of the combinations of $x_1$ and $x_2$ designated by the interval designation section 222, the divergence calculation section 224 of the image processing section 220 calculates a degree of divergence J between the unit rectangular function r[x] and the image variation amount array E. The degree of divergence J is a sum of differences between the unit rectangular function r[x] and the image variation amount array E for the respective index numbers x. More specifically, a sum of squared values of the differences between the unit rectangular function r[x] and the image variation amount array E serves as the degree of divergence J.

$$J = \sum_{i=0}^{N-2} (e[x] - r[x])^2$$

A movement interval that is defined by the values $x_1$ and $x_2$ designated by the interval designation section 222 when the degree of divergence J is at a minimum is referred to as a movement interval $D_{min}$. The image extraction section 225 extracts the reduced images ps that respectively define all the image variation amounts e contained in this movement interval $D_{min}$ from the reduced images of the frame images input by the image input section 210.

Next, general features of the flow of the image extraction processing of Step S5 will be described. In the following descriptions, a minimum value of the degree of divergence J is $J_{min}$, the start point of the movement interval D with the degree of divergence $J_{min}$ is $m_1$ and the end point is $m_2$, and index numbers of the reduced image array PS corresponding to the start point $m_1$ and the end point $m_2$ are $x_{in}$ and $x_{out}$.

Firstly, the image processing section 220 sequentially calculates the degree of divergence J while altering $x_1$ and $x_2$, and by comparing the sequentially calculated degrees of divergence J with one another, finds the degree of divergence $J_{min}$ that is the smallest value among the sequentially calculated degrees of divergence J. Then, the image processing section 220 finds the start point $m_1$ and end point $m_2$ of the movement interval $D_{min}$ that is designated when the degree of divergence J is at the degree of divergence $J_{min}$. At this time, the image processing section 220 performs a complete search of all the combinations of values that $x_1$ and $x_2$ may have. Herein, $x_1$ and $x_2$ are discrete values.

The complete search in the first embodiment is processing to alter $x_1$ between zero and (N−3), altering $x_2$ between $x_1$ and (N−2), and to check the degree of divergence J for all of the combinations of $x_1$ and $x_2$. More specifically, $x_1$ is first fixed at zero, and $x_2$ is altered from 1 to (N−2). Then $x_1$ is fixed at 1 and $x_2$ is altered from 2 to (N−2) Then $x_1$ is fixed at 2 and $x_2$ is altered from 3 to (N−2). In this manner, the image processing section 220 increases the value of $x_1$ from zero to (N−3) in increments of 1, and $x_2$ is correspondingly increased in increments of 1 from each value of $x_1$. Each time either of $x_1$ and $x_2$ is altered, the image processing section 220 checks the degree of divergence J calculated at that time.

It should be noted that, ordinarily, because the number of frame images obtained by a cycle of continuous photography is of the order of several frames, the indices x of the frame images are kept relatively small. Therefore, a load of processing on the control section 260 (the CPU 9) due to the complete search is small.

Figure 8:
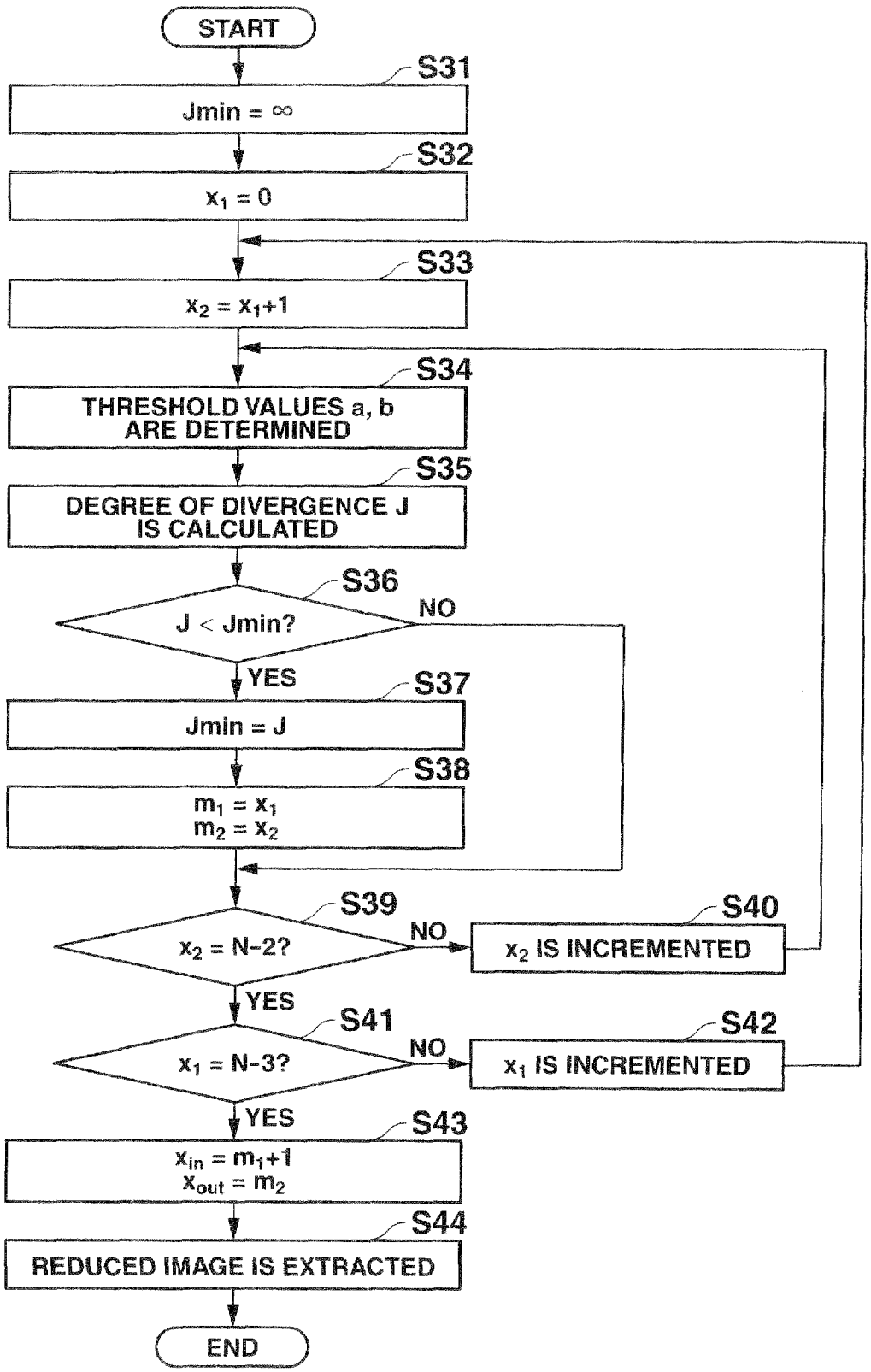
FIG. 8 is a flowchart showing an image extraction processing, according to the first embodiment of the present invention.
Figure 9:
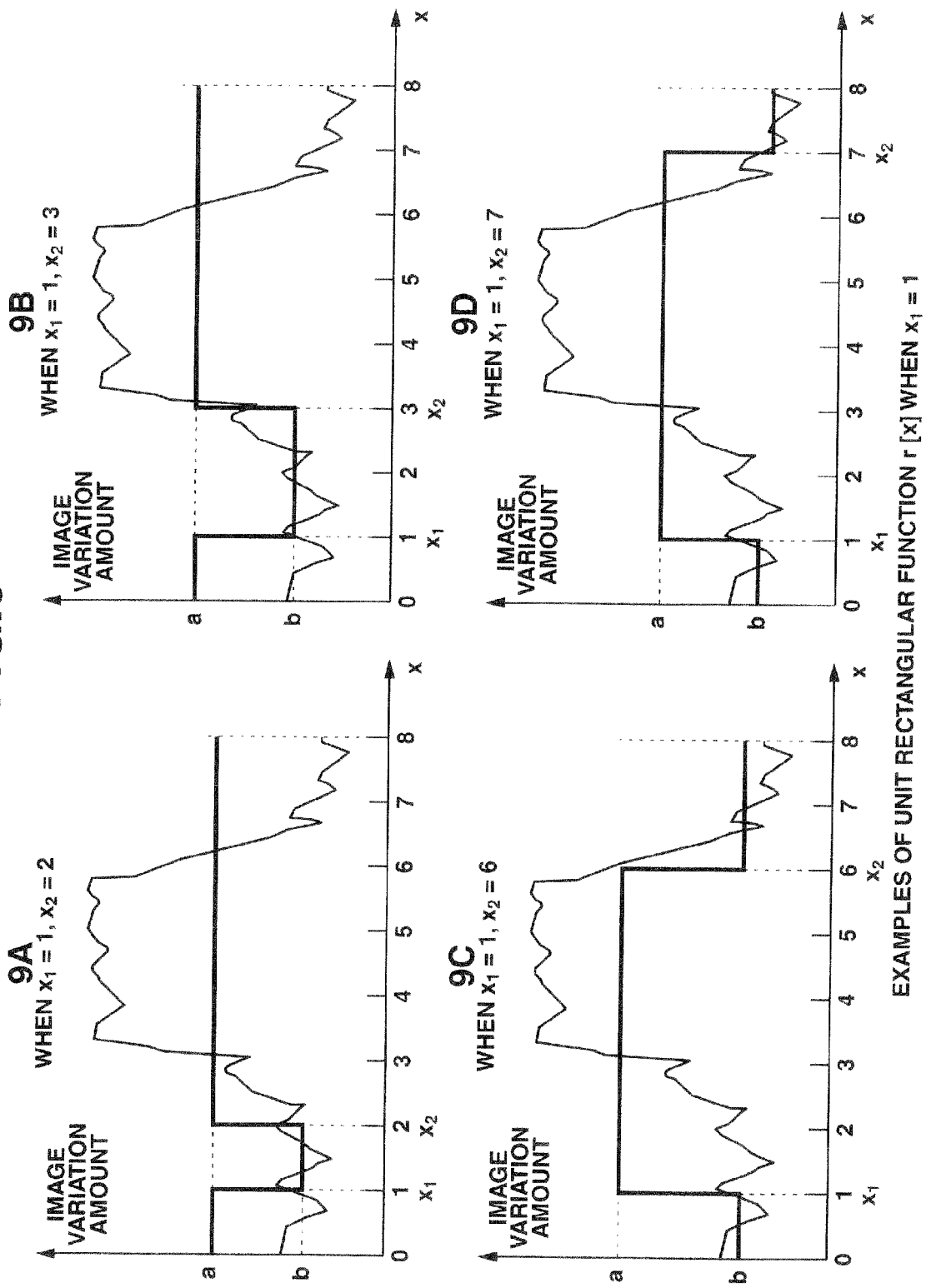
FIG. 9 is a diagram showing specific examples of a unit rectangular function, according to the first embodiment of the present invention.
Figure 10:
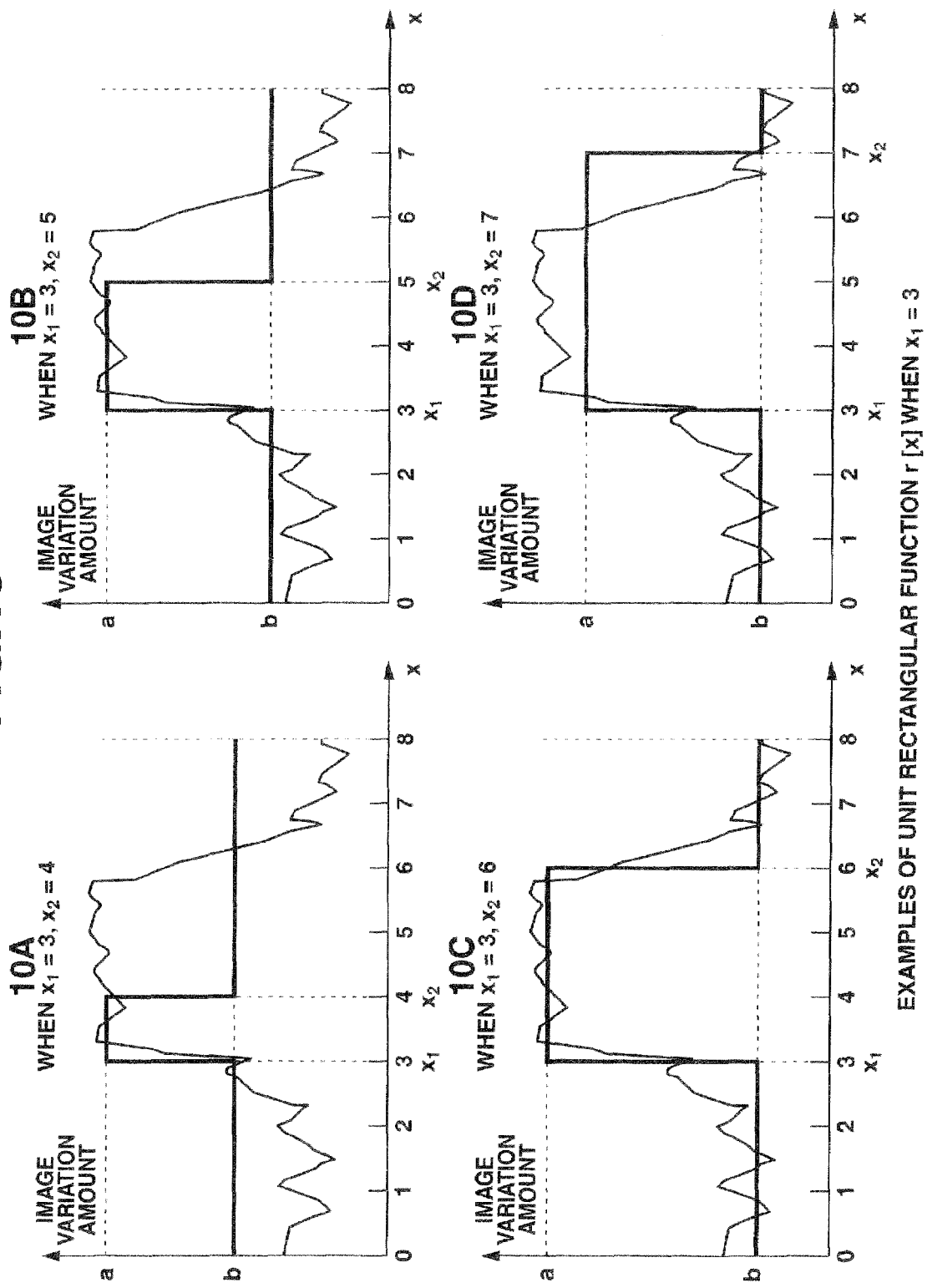
FIG. 10 is a diagram showing specific examples of a unit rectangular function, according to the first embodiment of the present invention.

FIG. 8 is a flowchart showing an example of detailed flow of the image extraction processing of Step S5. Details of the image extraction processing will be described with reference to FIG. 8. In the following descriptions, this image extraction processing is carried out by the image processing section 220 in accordance with control by the control section 260.

Firstly, the image processing section 220 sets an initial value of $J_{min}$ to a predetermined value significantly close to infinity (Step S31). Then the interval designation section 222 of the image processing section 220 sets the initial value of $x_1$ to zero (Step S32), and sets the initial value of $x_2$ to $x_1+1$ (Step S33). Next, the value determination section 223 of the image processing section 220 determines the function value a of the movement interval D of the unit rectangular function r[x] and the function value b of the non-movement intervals D' (Step S34). Then the divergence calculation section 224 of the image processing section 220 calculates the degree of divergence J (Step S35).

Next, the image processing section 220 judges whether or not the degree of divergence J calculated by the processing of Step S35 is smaller than $J_{min}$ (Step S36). In a case where the judgment of Step S36 is "No", the image processing section 220 advances the processing to Step S39. On the other hand, in a case where the judgment of Step S36 is "Yes", the image processing section 220 advances the processing to Step S37. In Step S37, the image processing section 220 sets the degree of divergence J calculated by the processing of Step S35 as $J_{min}$. Then, the image processing section 220 provisionally sets the start point $m_1$ to $x_1$ and provisionally sets the end point $m_2$ to $x_2$ (Step S38).

In Step S39, the image processing section 220 judges whether or not $x_2$ equals N−2 (N being the photograph number specified in the processing of Step S1). In a case where the judgment of Step S39 is "Yes", the image processing section 220 advances the processing to Step S41. Then, the image processing section 220 judges whether or not $x_1$ equals N−3 (Step S41). In a case where the judgment of Step S41 is "Yes", the image processing section 220 advances the processing to Step S43. In a case where the judgment of Step S41 is "No", the image processing section 220 increments the counter $x_1$ (increases $x_1$ by 1) (Step S42), and returns the processing to Step S33.

On the other hand, in a case where the judgment of Step S39 is "No", the image processing section 220 increments the counter $x_2$ (increases $x_2$ by 1) (Step S40), and returns the processing to Step S34.

In Step S43, the loop processing of Steps S33 to S41 ends. Thus, the start point $m_1$ and the end point $m_2$ are settled. The values $m_1$ and $m_2$ are index numbers in the image variation amount array E, and the image variation amounts $e[m_1]$ and $e[m_2]$ at $m_1$ and $m_2$ are each calculated on the basis of two reduced images ps. Therefore, it is necessary to determine which two reduced images ps are to be employed as $ps[x_{in}]$ and $ps[x_{out}]$ in correspondence with the image variation amounts $e[m_1]$ and $e[m_2]$. Accordingly, in Step S43, the image processing section 220 sets ($m_1+1$) as the start point $x_{in}$ and sets $m_2$ as the end point $x_{out}$.

In Step S44, from the reduced image array PS, a time-series continuous set of reduced images is extracted, from the reduced image $ps[x_{in}]$ of the start point of the movement interval D to the reduced image $ps[x_{out}]$ of the end point. After the processing of Step S44, the image processing section 220 ends the image extraction processing.

In the first embodiment, the unit rectangular function r[x] whose function values are a and b is defined to serve as a comparison object of the image variation amount array E. The function value a is the average value of the image variation amount array E in the movement interval D, and the function value b is the average value of the image variation amount array E in the non-movement intervals D'. Therefore, these function values vary dynamically with the positions of the start point $x_1$ and end point $x_2$ of the movement interval D. Therefore, simply by comparing the image variation amount array E with the thresholds a and b and finding the minimum value $J_{min}$ of the degree of divergence J, the image variation amount $e[m_1]$ at the start point $m_1$ and the image variation amount $e[m_2]$ at the end point $m_2$ for this degree of divergence $J_{min}$ can be accurately extracted as image variation amounts at which changes are relatively large. Thus, a frame image group with large image variation amounts, which is to say a frame image group with large movements of a subject, can be extracted.

FIG. 9A to FIG. 9D are specific examples of the unit rectangular function r[x] when $x_1$=1, and FIG. 10A to FIG. 10D are specific examples of the unit rectangular function r[x] when $x_1$=3. In FIG. 9A to FIG. 9D and FIG. 10A to FIG. 10D, the horizontal axes are the index numbers x and the vertical axes are the image variation amounts. In FIG. 9A to FIG. 9D and FIG. 10A to FIG. 10D, The rectangular waveforms plotted with heavy solid lines show the unit rectangular function r[x], and the waveforms plotted with light solid lines show the image variation amount array E. Because the values of the image variation amounts e[x] are discrete values, in FIG. 9A to FIG. 9D and FIG. 10A to FIG. 10D, the values of the image variation amounts e[x] are joined with straight lines.

As is shown in FIG. 9A to FIG. 9D and FIG. 10A to FIG. 10D, because the function value a of the unit rectangular function r[x] is the average value of the image variation amount array E in the movement interval D and the function value b is the average value of the image variation amount array E in the non-movement intervals D', it is seen that the function values a and b vary dynamically in accordance with the positions of the start point $x_1$ and the end point $x_2$ of the movement interval D. The waveform showing the unit rectangular function r[x] and the waveform showing the image variation amount array E are closest in FIG. 10C. Therefore, it can be understood that the degree of divergence J is at a minimum when $x_1=3$ and $x_2=6$ as in FIG. 10.

As described hereabove, the image processing device 100 related to the first embodiment sets the function value a of the unit rectangular function r[x] to the average value of the image variation amount array E in the movement interval D and sets the function value b to the average value of the image variation amount array E in the non-movement intervals D'. Then the image processing device 100 finds $J_{min}$, at which the degree of divergence J between the function values a and b and the image variation amount array E is at a minimum. With this degree of divergence $J_{min}$, the image processing device 100 finds the image $p[x_{in}]$ corresponding to the image variation amount $e[m_1]$ at the start point $m_1$ and the image $p[x_{out}]$ corresponding to the image variation amount $e[m_2]$ at the end point $m_2$. Hence, a chronologically continuous frame image group is extracted from the image array P, from the frame image $p[x_{in}]$ to the frame image $p[x_{out}]$.

Thus, the two function values a and b are not fixed values but average values of the image variation amount array E that vary dynamically in accordance with the positions of the start point $x_1$ and end point $x_2$ of the movement interval D. Accordingly, simply by comparing the threshold values a and b with the image variation amount array E and finding the minimum value $J_{min}$ of the degree of divergence J, the image variation amount $e[m_1]$ at the start point $m_1$ and the image variation amount $e[m_2]$ at the end point $m_2$ can be accurately extracted to serve as image variation amounts with relatively large changes. Consequently, a frame image group in which the subject moves greatly can be accurately extracted from the image array P that is continuous in chronological order. Therefore, the image processing device 100 related to the present embodiment can properly extract just images in which movements of a subject within a photography range are large, for example: from successively photographed images of a scene such as an athletic competition, a ball game or the like in which a subject (an athlete, a ball or the like) passes through the photography range; or successively photographed images of a scene such as a gymnastic competition in which a subject in the photography range (a gymnast) acts in the sequence stationary-moving-stationary.

Furthermore, even if, for example, the values of the image variation amounts e change due to hand blurring, that is, even if the positions of the waveform showing the image variation amount array E illustrated in FIG. 9A to FIG. 10D or the like vary vertically due to hand blurring, because the function values a and b are both average values of the image variation amount array E, the function values a and b track these changes. Thus, with the image processing device 100 related to the first embodiment, there is no need to adjust threshold values as in convention, there is very little effect from disturbances such as hand blurring and the like, a frame image group in which subject movements are large can be properly extracted regardless of photography conditions, and there is a high level of general applicability.

In a case in which a background region of the images and conditions of the subject region are substantially constant, variation amounts between chronologically successive frame images increase in proportion to the size of movements of the subject between the frame images. In practice however, between frame images, differences in background regions being concealed by the subject, differences in size and details of the subject region, differences in overall edges due to hand blurring, and the like occur. Therefore, there is a problem in that variation amounts between chronologically successive frame images vary in an unstable manner.

Accordingly, in the image processing device 100 related to the first embodiment, the unit rectangular function r[x] constituted by the two function values a and b is defined. This unit rectangular function r[x] is defined simply by determining the two parameters, the start point $x_1$ and the end point $x_2$ of the movement interval D, with the function values being, at the movement interval D, the average value a of the image variation amounts e included in the movement interval D and, for the non-movement intervals D', the average value b of the image variation amounts e included in the non-movement intervals D'. Therefore, even if some of the image variation amounts e are somewhat altered by noise, the relative relationship between the unit rectangular function r[x] and the image variation amount array E is not greatly affected by the alterations in those image variation amounts e. Thus, the image processing device 100 is resistant to disturbances.

Now, in a case in which continuous photography is carried out, if hand blurring occurs only in a certain period directly after the shutter button is pressed because of the shutter button being pressed by a user, variation amounts of images that are photographed just after the shutter button is pressed are large. In this case, for example, in the photography situation shown in FIG. 4, the variation amounts between chronologically continuous frame images are large in two different photography intervals, the photography interval just after the shutter button is pressed and the photography interval in which the automobile passes through the photography range. Thus, in this case, there is a concern that frame image groups may be extracted from each of these two different photography intervals. For example, in the photography situation shown in FIG. 4, there is a problem to be considered of images photographed just after the shutter button is pressed being extracted, that is, of a frame image group with trivial changes and the subject not being present in the photography range being extracted.

However, according to the image processing device 100 related to the first embodiment, because it is specified that there is only one photography interval for which a frame image group is extracted (the movement interval D), the likelihood of unnecessary frame image groups being extracted can be reduced. That is, according to the image processing device 100 related to the first embodiment, even if there is a plurality of intervals of convex shapes in a waveform representing the image variation amount array E because of the effects of disturbances such as hand blurring and the like—that is, even if there is a plurality of intervals in the image variation amount array E at which the image variation amounts e are large intervals in which the image variation amounts between images are large because of the effects of disturbances such as hand blurring and the like can be excluded from the object of extraction, and just images in which movements of the subject image are large can be reliably extracted.

The image processing device 100 related to the first embodiment calculates the image variation amounts e on the basis of differences between chronologically successive reduced images ps in the reduced image array PS. Because photography time intervals between the frame images corresponding to the chronologically successive reduced images ps in the reduced image array PS are short, even if hand blurring, fluorescent light flickering or the like occurs, the image variation amounts e between the chronologically successive reduced images ps do not greatly change. Thus, the image variation amounts are unlikely to be affected by disturbances. Therefore, even when a user poses the image processing device 100 and executes photography with their own hands, there is no need to execute positioning processing between the reduced images ps, and a computational load on the image processing section 220 (the CPU 9) can be reduced.

Second Embodiment

Next, a second embodiment of the present invention will be described In the second embodiment, the constitution of the image processing section 220 and the image extraction processing of Step S5 differ from the first embodiment. Since other structures and processing are the same as in the first embodiment, descriptions thereof are omitted.

Figure 11:
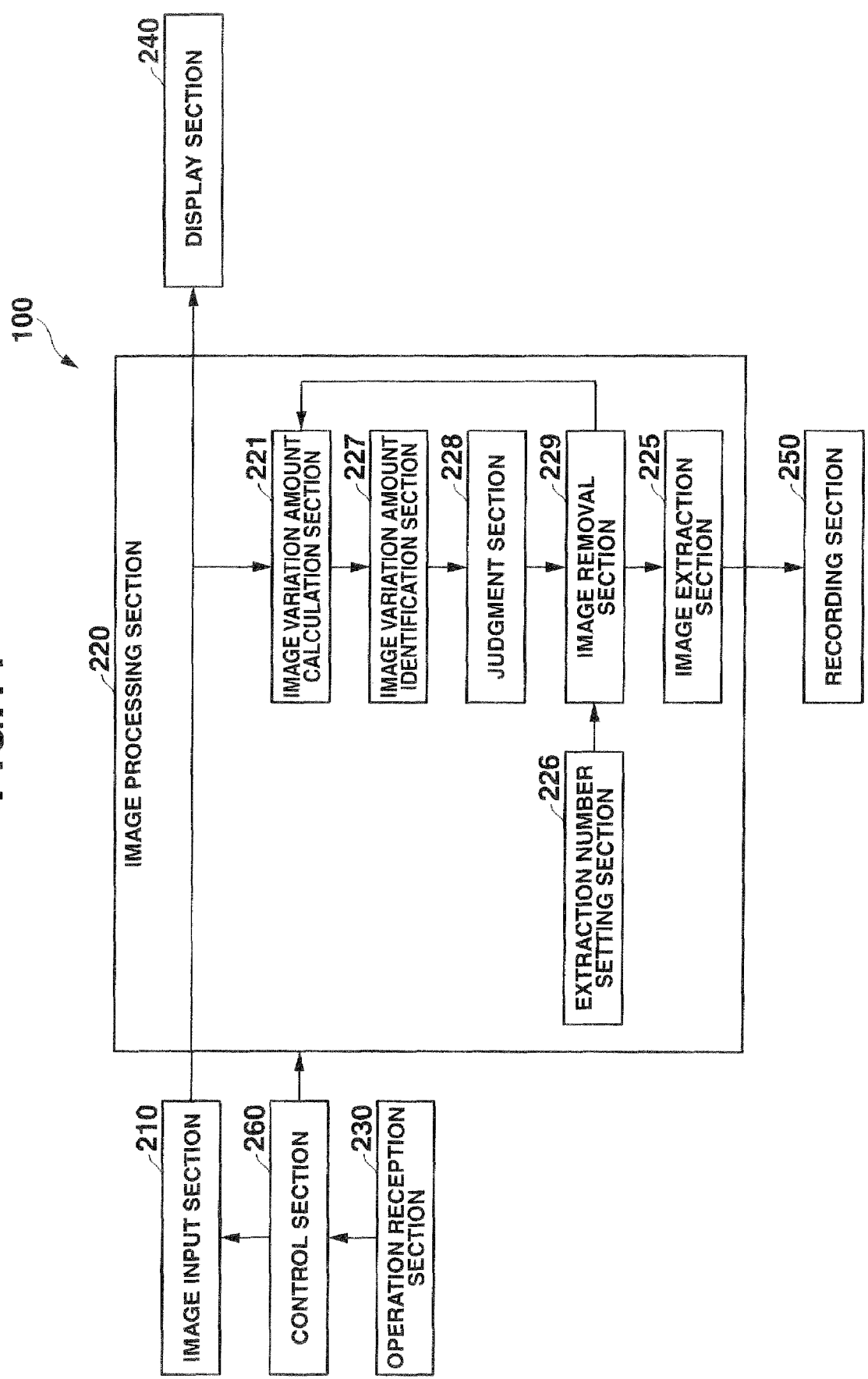
FIG. 11 is a block diagram showing a functional structure of an image processing device related to a second embodiment of the present invention.

FIG. 11 is a block diagram showing a functional structure of the image processing device 100 related to the second embodiment. Among the functional structure of the image processing device 100 related to the second embodiment, only the constitution of the image processing section 220 differs from the first embodiment. The image processing section 220 of the second embodiment is anticipated to be provided with the image variation amount calculation section 221, an extraction number setting section 226, an image variation amount identification section 227, a judgment section 228, an image removal section 229 and the image extraction section 225.

In the second embodiment, the image variation amount calculation section 221 first respectively calculates variation amounts (for example, sums of differences between pixel values) between chronologically successive reduced images from the reduced images of the frame images input by the image input section 210. Then, every time a reduced image is removed by the image removal section 229, the variation amounts between chronologically successive reduced images for the reduced images from which the removed reduced images have been removed are repeatedly calculated, from among the reduced images of the frame images input by the image input section 210.

In response to an operation for setting the extraction number by the user, the extraction number setting section 226 sets the extraction number M in accordance with the operation. At the time of this setting processing, a signal representing the extraction number M being set by the operation by the extraction user is provided from the operation reception section 230 to the extraction number setting section 226 via the control section 260. The extraction number setting section 226 may be realized by the CPU 9 shown in FIG. 1.

Every time the image variation amount calculation section 221 calculates the image variation amounts in response to a reduced image being removed by the image removal section 229, the image variation amount identification section 227 identifies an image variation amount that is smallest among the calculated image variation amounts. At this time, the image variation amount identification section 227 also identifies the two image variation amounts that are chronologically successive with the identified smallest image variation amount. The image variation amount identification section 227 may be realized by the CPU 9 shown in FIG. 1.

Every time the image variation amount identification section 227 identifies an image variation amount, the judgment section 228 judges which of the two image variation amounts that are adjacent in chronological order before and after the smallest variation amount is the smaller. The judgment section 228 provides the result of this judgment to the image removal section 229. The judgment section 228 may be realized by the CPU 9 shown in FIG. 1.

The image removal section 229 removes the reduced image between the smallest image variation amount and the image variation amount that is judged to be smaller, as represented by the judgment result provided from the judgment section 228, from the reduced image array PS. The image removal section 229 may be realized by the CPU 9 shown in FIG. 1.

In the second embodiment, the image extraction section 225 extracts, from the reduced images of the frame images input by the image input section 210, the reduced images that remain having not been removed by the image removal section 229.

Figure 12:
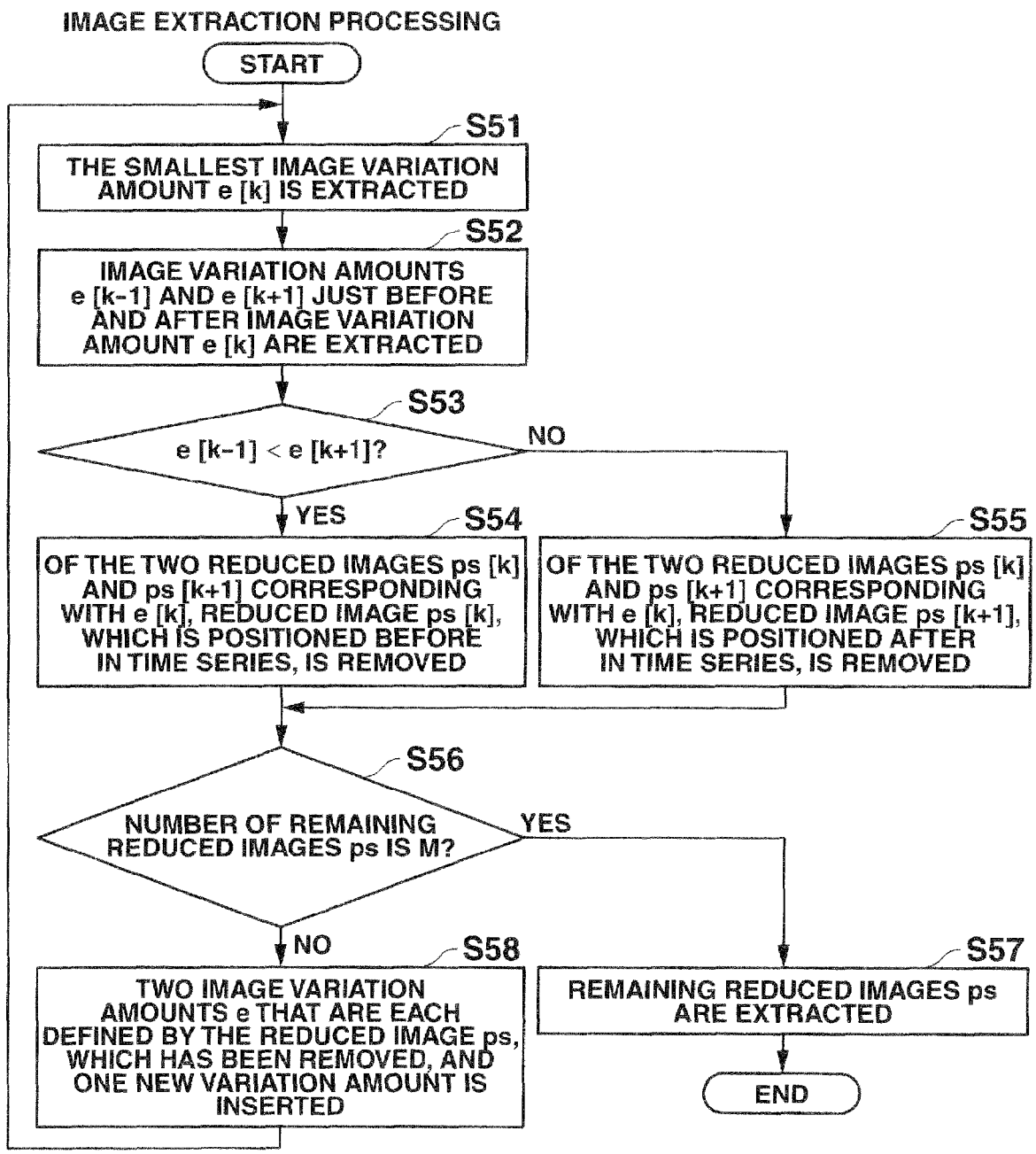
FIG. 12 is a flowchart showing a flow of continuous photography processing, according to the second embodiment of the present invention.

FIG. 12 is a flowchart showing an example of the flow of the image extraction processing related to the second embodiment (the processing of Step S5). Details of the image extraction processing related to the second embodiment will be described with reference to FIG. 12. In the following descriptions, this image extraction processing is carried out by the image processing section 220 in accordance with control by the control section 260.

Firstly, in Step S51, the image variation amount identification section 227 of the image processing section 220 identifies the smallest image variation amount e in the image variation amount array E. In the following descriptions, the smallest image variation amount identified by the processing of Step S51 is e[k]; that is, the index number corresponding to the identified smallest image variation amount is k.

In Step S52, the image variation amount identification section 227 of the image processing section 220 identifies the image variation amount e[k−1] and the image variation amount e[k+1]. In the image variation amount array E, the image variation amount e[k−1] is the image variation amount that is adjacent in chronological order before (preceding) the image variation amount e[k]. In the image variation amount array E, the image variation amount e[k+1] is the image variation amount that is adjacent in chronological order after (subsequent to) the image variation amount e[k].

In Step S53, the judgment section 228 of the image processing section 220 judges whether or not the image variation amount e[k−1] is smaller than the image variation amount e[k+1] In a case where the judgment of Step S53 is "Yes", the image processing section 220 advances the processing to Step S54. On the other hand, in a case where the judgment of Step S53 is "No", the image processing section 220 advances the processing to Step S55.

In Step S54, of the two reduced images ps[k] and ps[k+1] corresponding with the image variation amount e[k], the image removal section 229 of the image processing section 220 removes the reduced image ps[k] that is positioned before the image variation amount e[k] in chronological order from the reduced image array PS. In other words, of the two reduced images ps[k−1] and ps[k] that define the image variation amount e[k−1], the image removal section 229 removes the reduced image ps[k] that is positioned after in chronological order.

In Step S55, of the two reduced images ps[k] and ps[k+1] corresponding with the image variation amount e[k], the image removal section 229 of the image processing section 220 removes the reduced image ps[k+1] that is positioned after the image variation amount e[k] in chronological order from the reduced image array PS. In other words, of the two reduced images ps[k+1] and ps[k+2] that define the image variation amount e[k+1], the image removal section 229 removes the reduced image ps[k+1] that is positioned before in chronological order.

In Step S56, the judgment section 228 of the image processing section 220 judges whether or not the number of reduced images ps that remain in the reduced image array PS consequent to a reduced image being removed by the immediately previous processing of Step S54 or Step S55 is M. In a case where the judgment of Step S56 is "No", the image processing section 220 advances the processing to Step S58.

Figure 13:
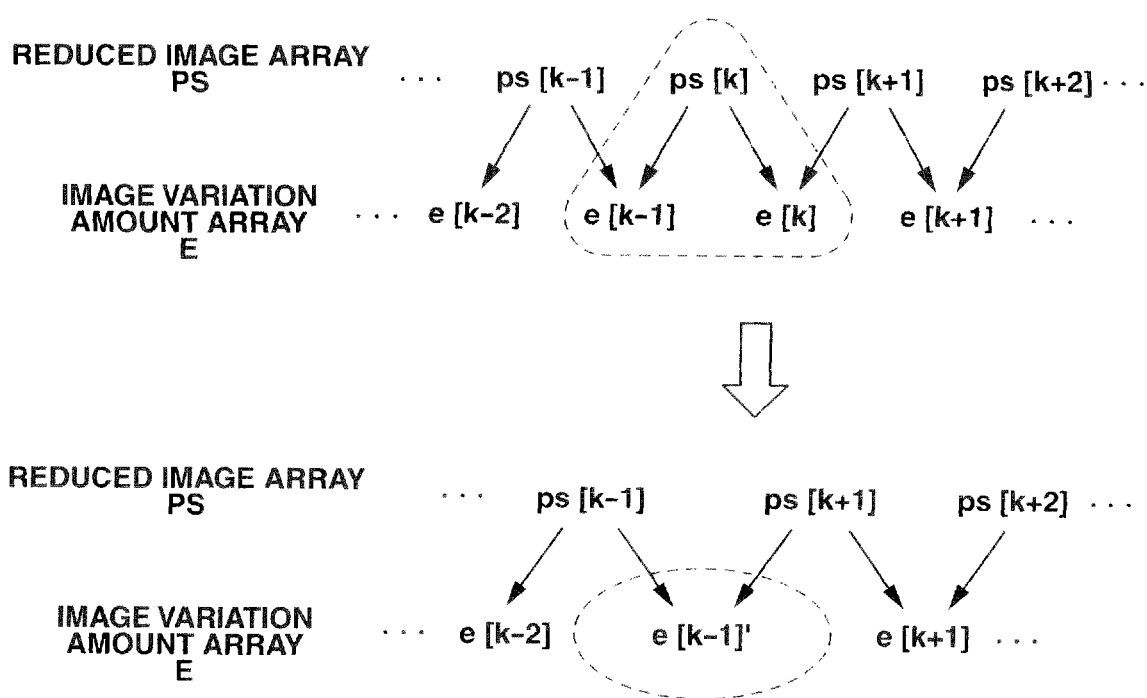
FIG. 13 is a diagram illustrating a change in a reduced image array and an image variation amount array tiring the continuous photography processing according to the second embodiment of the present invention.

In Step S58, the image removal section 229 of the image processing section 220 removes from the image variation amount array E the two image variation amounts e that are each defined by the reduced image ps which has been removed by the immediately previous processing of Step S54 or Step S55 is M. In this removal processing, for example, as shown in FIG. 13, in a case where the reduced image ps[k] is being removed, the image removal section 229 removes the two image variation amounts e[k] and e[k−1] that were defined by the removed reduced image ps[k], calculates an image variation amount e[k−1]' that represents a variation amount between the reduced images ps[k−1] and ps[k+1] neighboring the removed reduced image ps[k], and inserts the image variation amount e[k−1]' into the image variation amount array E.

On the other hand, in a case where the judgment of Step S56 is "Yes", the image extraction section 225 of the image processing section 220 extracts the remaining M reduced images ps (Step S57). After the processing of Step S57, the image processing section 220 ends the image extraction processing.

As described above, until there are M reduced images ps remaining ("Yes" in Step S56), the image processing section 220 continues to extract minimum reduced image variation amounts in Step S51, continues to remove reduced images ps in Step S54 and S55, and continues to remove image variation amounts e in Step S58. The smallest image variation amount e in the Image variation amount array E that is finally left rather than being removed in Step S58 varies in accordance with the specified value of M. That is, if the specified value of M is small, the smallest image variation amount e in the image variation amount array E that is finally left without being removed in Step S58 is large. On the other hand, if the specified value of M is larger, the smallest image variation amount e in the image variation amount array E that is finally left without being removed in Step S58 is smaller. Accordingly, from Step S51, this may be described as continuing to remove all image variation amounts e smaller than a particular image variation amount corresponding to the specified value of M (the smallest image variation amount e in the image variation amount array E that is finally left rather than being removed in Step S58), until there are M reduced images ps remaining ("Yes" in Step S56).

According to the present embodiment, the image processing device 100 related to the second embodiment arranges the image variation amounts e in chronological order to form the image variation amount array E, extracts image variation amounts e[k] with relatively small values by comparing the image variation amounts e with one another, removes reduced images p corresponding to the extracted image variation amounts e[k], and extracts the frame images corresponding to the remaining reduced images from the image array P. That is, the image processing device 100 related to the second embodiment concentrates on relative relationships between the image variation amounts e, and extracts the images p that correspond with extracted image variation amounts e with relatively large values from among the image variation amount array E. Therefore, even when the image variation amounts e vary due to hand blurring by a user, these variations can be tracked, and thus just images with large movements of the subject can be accurately extracted, regardless of photography conditions.

The image processing device 100 related to the second embodiment concentrates on relative relationships between the image variation amounts e, and removes only images p for which an image variation amount e is relatively small from among the image variation amount array E, that is, redundant images with trivial changes. Differently from the extraction of a continuous image group as in the first embodiment, only images with large movements are extracted, in a dispersed manner. Therefore, this is not limited to particular movement models as in the first embodiment, and can be applied to general movement scenes, such as subjects stopping and subjects moving in a relatively irregular manner. Thus, in a case of synthesizing photographic images to produce a single synthesized image of a scene in which, for example, stasis and motion of a subject in the photography range are irregularly repeated, synthesis of redundant images with trivial changes can be avoided. That is, if a synthesized image is created by synthesizing a frame image group extracted by the image processing device 100 related to the second embodiment, a synthesized image in which there is dynamism in the movement of the subject image can be obtained.

Other Modifications

The present invention is not to be limited to the embodiments described above, and modifications and improvements, etc. within a scope capable of achieving the object of the present invention are to be encompassed by the invention.

For example, in the above-described first embodiment, the degree of divergence J is calculated for all combinations of $x_1$ and $x_2$. However, it is not limited thereto, and where a result of comparing the function values a and b of the unit rectangular function r[x] is that a<b, if the difference between the function value b and the function value a is small, this combination may be excluded from search subjects. In this manner, combinations of $x_1$ and $x_2$ that are clearly not the best solution are excluded, the load required for computation processing by the image processing section 220 (the CPU 9) can be reduced, and processing can be made faster.

Furthermore, in the first embodiment described above, although it is specified that $0<x_1<x_2<N-2$, such that $x_1$ and $x_2$ representing the convex portion of the unit rectangular function r[x] are not at a boundary-zero or (N−2). However, it is not limited thereto, and it may be specified that $0 \leqq x_1 < x_2 \leqq N-2$, such that $x_1$ and $x_2$ representing the convex portion of the unit rectangular function r[x] can be at a boundary zero or (N−2).

In the first embodiment described above, the shape of the convex portion of the unit rectangular function is a rectangle. However, the shape of the convex portion may be, for example, a trapezoid.

In the embodiments described above, for chronologically successive reduced images ps, the sum of absolute values of differences between pixel values at the same positions are calculated to serve as the image variation amount e. However, a sum of squares of the differences between pixel values at the same positions may be calculated to serve as the image variation amount e, and any method that is capable of quantifying a difference between images may be used. Furthermore, in a case in which the reduced images ps are color images, differences between the respective color components of the reduced images ps may be calculated.

In the embodiments described above, although differences between pixel values over the whole of the images are calculated. However, it is not limited thereto, and a window or search frame may be specified and differences between pixel values only for portions of the images may be calculated Accordingly, the computational load on the image processing section 220 can be reduced and processing can be made faster.

In the embodiments described above, differences between pixel values between the reduced images ps are employed as the image variation amounts e. However, the image variation amounts e may be movement vectors representing movements of the subject between the reduced images ps.

In the embodiments described above, the reduction processing, to reduce the frame images p and create the reduced images ps, and the image variation amount calculation processing, to calculate variation amounts between the reduced images ps to serve as the image variation amounts e, are executed after all the images have been obtained by continuous photography. However, this processing may be carried out while the continuous photography is being executed.

In the first embodiment, the function value a of the unit rectangular function r[x] is an average value of values of the image variation amount array E in the movement interval D, but the function value a may be a central value of values of the image variation amount array E in the movement interval D. Moreover, in the first embodiment, the function value b of the unit rectangular function r[x] is an average value of values of the image variation amount array E in the non-movement intervals D'; however, he function value b may be a central value of values of the image variation amount array E in the non-movement intervals D'.

In the first embodiment, a total of squared values of the differences between the unit rectangular function r[x] and the image variation amount array E serves as the degree of divergence J. However, a total of absolute values of the differences between the unit rectangular function r[x] and the image variation amount array E may serve as the degree of divergence J, and a total of cubed values of the differences between the unit rectangular function r[x] and the image variation amount array E may serve as the degree of divergence J. That is, the degree of divergence J may be any parameter as long as the degree of divergence J represents an absolute difference between the unit rectangular function r[x] and the image variation amount array E.

In the embodiments described above, the reduction processing that reduces the frame images p and creates the reduced images ps is executed. However, rather than executing the reduction processing, the image variation amounts may be calculated from the unreduced frame images. In this case however, disturbances such as hand blurring and the like are more likely to have an effect, and positioning processing will often be necessary for handheld photography. Therefore, executing the reduction processing reduces the computational load compared to executing positioning processing. Furthermore, in the reduction processing, an aspect ratio of the reduced images may be suitably altered from the aspect ratio of the unreduced frame images.

In addition, the first embodiment and the second embodiment may be combined. For example, the movement interval D may be extracted by the image extraction processing of the first embodiment and then M frame images may be extracted from the movement interval D by the image extraction processing of the second embodiment.

The present invention is not to be limited to digital cameras, and may also be applied to personal computers that do not have photography functions and so forth.

What is claimed is:

1. An image processing device comprising:
an image input section that inputs a plurality of images that are continuous in chronological order;
a variation amount calculation section that calculates respective variation amounts caused by movements of a subject between images that are adjacent in chronological order, for the plurality of input images;
an interval designation section that sequentially designates a first interval contained in an entire interval in which all of the plurality of images are present in chronological order, while sequentially altering the first interval, and sequentially designates a second interval, which is an interval excluding the sequentially designated first interval from the entire interval;
a representative value determination section that determines a first representative value based on first variation amounts, which are calculated by the variation amount calculation section from the images that are present in the designated first interval, and that determines a second representative value based on second variation amounts, which are calculated by the variation amount calculation section from the images that are present in the designated second interval;
a degree of divergence calculation section that, each time the first interval is designated, calculates a first degree of divergence between the first variation amounts and the first representative value and, each time the second interval is designated, calculates a second degree of divergence between the second variation amounts and the second representative value; and
an image extraction section that extracts images that are present in the first interval designated by the interval designation section at a time when a sum of the calculated first degree of divergence and second degree of divergence is at a minimum.

2. The image processing device according to claim 1, wherein the representative value determination section determines an average value of the first variation amounts calculated by the variation amount calculation section from the images that are present in the first interval as the first representative value, and determines an average value of the second variation amounts calculated by the variation amount calculation section from the images that are present in the second interval as the second representative value.

3. The image processing device according to claim 1, wherein the variation amounts caused by movements of the subject calculated by the variation amount calculating section are either sums of values based on differences between pixel values or movement vectors representing movements of the subject.

4. The image processing device according to claim 1, wherein the representative value determination section determines a median value of the first variation amounts calculated by the variation amount calculation section from the images that are present in the first interval as the first representative value, and determines a median value of the second variation amounts calculated by the variation amount calculation section from the images that are present in the second interval as the second representative value.

5. The image processing device according to claim 1, further comprising a window setting section that sets an image range for which variation amounts are calculated,
wherein the variation amount calculation section calculates variation amounts within the range set by the window setting section.

6. A non-transitory computer readable storage medium having a program stored thereon that is executable by a computer to function as sections comprising:
an image input section that inputs a plurality of images that are continuous in chronological order;
a variation amount calculation section that calculates respective variation amounts caused by movements of a subject between images that are adjacent in chronological order, for the plurality of input images;
an interval designation section that sequentially designates a first interval contained in an entire interval in which all of the plurality of images are present in chronological order, while sequentially altering the first interval, and sequentially designates a second interval, which is an interval excluding the sequentially designated first interval from the entire interval;

a representative value determination section that determines a first representative value based on first variation amounts, which are calculated by the variation amount calculation section from the images that are present in the designated first interval, and that determines a second representative value based on second variation amounts, which are calculated by the variation amount calculation section from the images that are present in the designated second interval;

a degree of divergence calculation section that, each time the first interval is designated, calculates a first degree of divergence between the first variation amounts and the first representative value and, each time the second interval is designated, calculates a second degree of divergence between the second variation amounts and the second representative value; and an image extraction section that extracts images that are present in the first interval designated by the interval designation section at a time when a sum of the calculated first degree of divergence and second degree of divergence is at a minimum.

* * * * *